April 21, 1931.  B. S. FRANKLIN  1,802,317

AUTOMATIC COMBUSTION CONTROL

Filed Feb. 13, 1925  6 Sheets-Sheet 1

INVENTOR
Bernard S. Franklin.

April 21, 1931.   B. S. FRANKLIN   1,802,317
AUTOMATIC COMBUSTION CONTROL
Filed Feb. 13, 1925   6 Sheets-Sheet 2
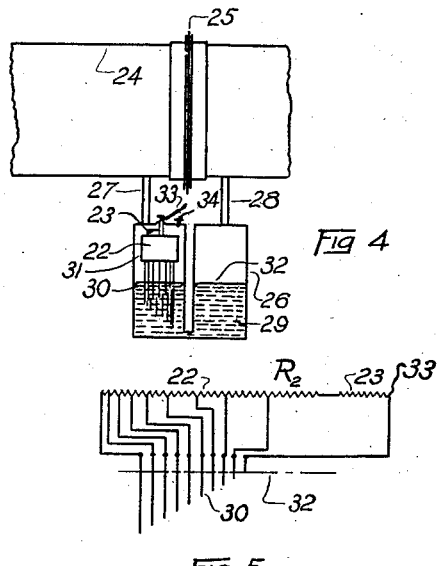
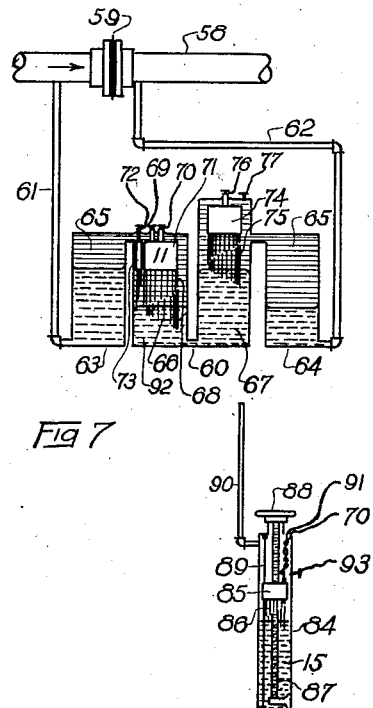
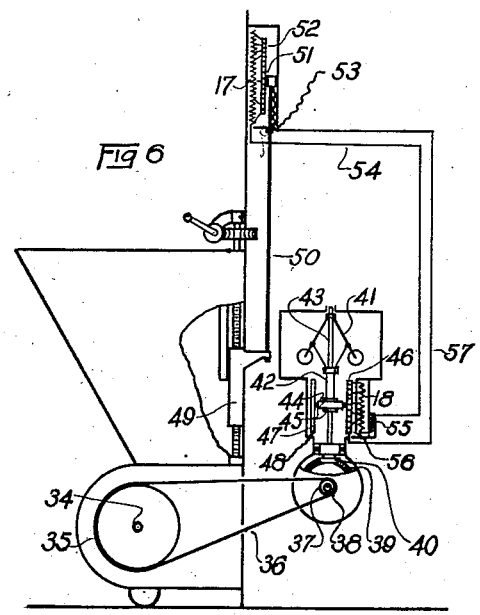
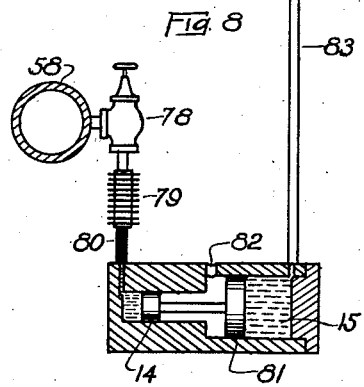
INVENTOR
Bernard S. Franklin.

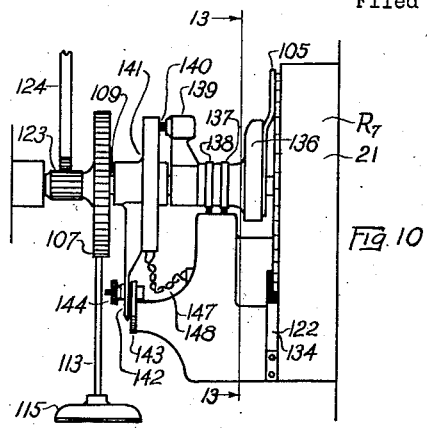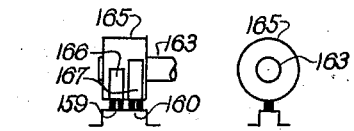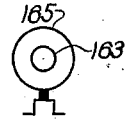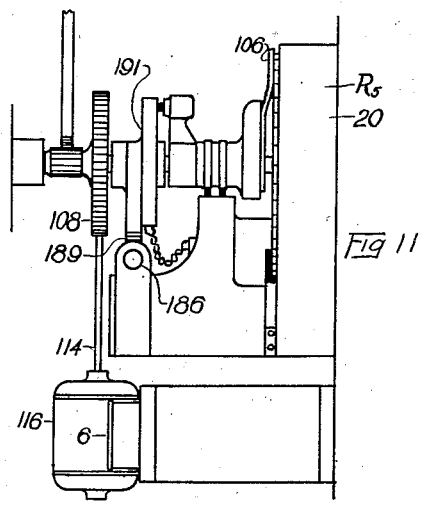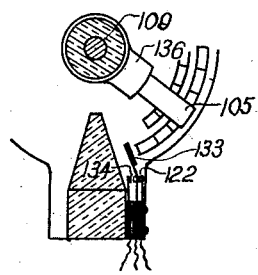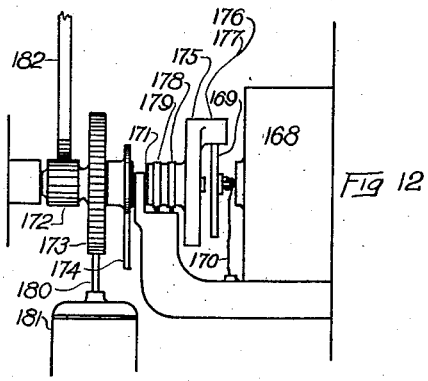

Patented Apr. 21, 1931

1,802,317

UNITED STATES PATENT OFFICE

BERNARD S. FRANKLIN, OF TROY, NEW YORK

AUTOMATIC COMBUSTION CONTROL

Application filed February 13, 1925. Serial No. 8,951.

This invention relates to a novel method whereby the ratios of the rates of movement of substances may be measured, and predetermined ratios be automatically maintained. The same apparatus serves to record the values of the ratios.

Broadly, the object of this invention is to provide a method, and apparatus therefor, to measure the ratios of the existing rates of movement of substances, and to control the rates of movement of these substances so as to maintain predetermined ratios.

More specifically the embodiment disclosed comprises apparatus the object of which is to measure the ratios of the steam leaving a boiler to the coal being supplied to the furnace; the coal being supplied to the air being supplied for combustion, or the reciprocal of the latter; or the steam leaving to the air being supplied. Not all of these ratios are needed simultaneously, any two being sufficient for the automatic combustion control, but the method and apparatus described makes the choice of the two ratios to be used optional.

A further object of the invention is to provide automatic means to maintain these ratios at predetermined values.

A further object of the invention is to provide automatic means whereby the predetermined values may, if desired, be variables dependent on the rate of steam flow.

A further object of the invention is to provide automatic means whereby the ratios actually existing may be recorded and indicated.

A further object of the invention is to automatically maintain the pressure existing in the boiler at a predetermined value.

A further object of the invention is to automatically vary this predetermined pressure according to the rate of use of steam, if such variation is desired.

A further object is to prevent the incorrect distribution of air among several boilers such as often results from differing fuel bed resistances, or the rush of air thru a "hole" in the fire.

A further object of the invention is to permit electrical interconnection of the various devices required, so offering the maximum flexibility in the location of such devices.

A further object of the invention is to permit the use of manual remote control when such is thought desirable.

The principal object, inherent in this design, is to provide fuel and air in the best proportion for the most efficient combustion, and in amounts exactly proportioned to the requirements of the boiler, taking account of load variations and boiler efficiency variations.

This automatic combustion control differs from others known to me in that the primary impulse affecting the fuel and air supply comes, not from a change in the boiler pressure which itself may be the result of a change in the rate of use of steam, but directly from such changes in the rate of use of steam. The control is not intended as a pressure regulator, but as a means to supply the correct amount of fuel and an amount of air calculated to give the most economical combustion.

The steam, air and fuel rates are measured, changed to their logarithms, and at a distant control panel the differences, or logarithms of the ratios, are obtained. These are changed to the antilogarithmic, or ratio values. Deviations from the desirable ratios affect remote control relays, and these alter damper positions, or motor rheostats, or steam turbine governor positions, so that the rates of supply of fuel and air may be changed to those values which will give the desirable ratios.

In strict theory, with these ratios maintained, there should be no change in boiler pressure. Because of external factors such as the admission of makeup feed water; soot cleaning for the boiler tubes; and the fact that the ratios cannot be held exactly correct; and because of the fact that a drop in boiler pressure usually is an evil rapidly aggravated, for the prime mover requires more of the lower pressure steam, and this increased steam use further decreases the pressure; some form of pressure regulation is essential. It is desirable, for the sake of simplicity and reliability, that the same fuel and air controls be used for this purpose. This is accomplished in the present invention by treating a drop in boiler pressure the same as an increase in steam consumption, so increasing the supply of fuel and air until the boiler pressure is raised to its correct value.

This invention makes use of an advanced combination of the more simple electrical network elements disclosed in my copending applications for a "ratio recorder" Ser. No. 751,198, filed on Nov. 20, 1924, and a "product recorder" Ser. No. 751,197, filed on Nov. 20, 1924.

The invention is described in detail with the aid of the accompanying drawings, in which Figs. 1, 2, and 3 are resistance networks, any one of which will give the desired ratios.

Fig. 4 is a diagrammatic view of an orifice, a U tube, and a logarithmic resistance as used for the air conduit.

Fig. 5 is a development of the wiring of the logarithmic resistance unit in Fig. 4.

Fig. 6 is a diagrammatic view of logarithmic resistances connected to a chain grate stoker.

Fig. 7 is a diagrammatic view of an orifice, a U tube, and related resistances, as used for the steam pipe.

Fig. 8 is a diagrammatic view of a boiler pressure mercury column, and an associated resistance unit.

Fig. 10 is an elevation taken on the line 10—10 in Fig. 9 looking in the direction of the arrows.

Fig. 11 is an elevation taken on the line 11—11 in Fig. 9 looking in the direction of the arrows.

Fig. 12 is an elevation taken on the line 12—12 in Fig. 9 looking in the direction of the arrows.

Fig. 13 is a section taken on the line 13—13 in Fig. 10 looking in the direction of the arrows.

Fig. 16 is a view of a limit switch applied to a damper shaft.

Fig. 17 is an end view of the same.

Fig. 18 is a development of the surface of the limit switch drum.

Figure 1:
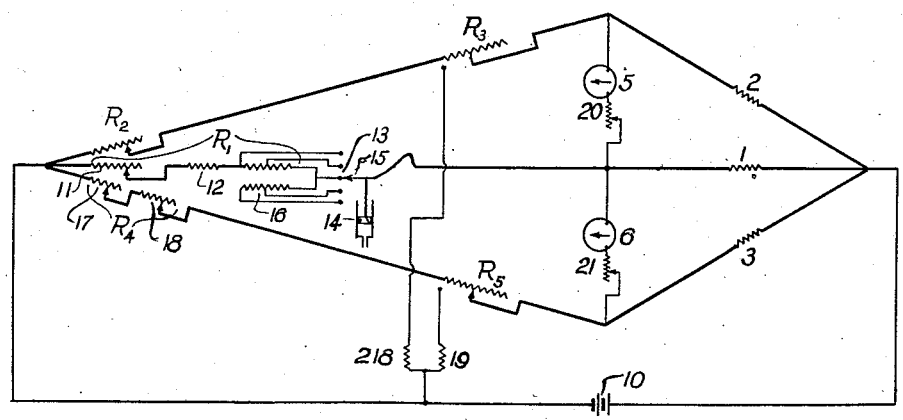

Referring to Fig. 1 the resistances $R_1$, $R_2$, $R_3$, 1, and 2, together with the galvanometer 5 and the current source 10, form a Wheatstone's bridge. Suppose that the resistance $R_1$ is always equal to the logarithm of the rate of flow of steam; that the resistance $R_2$ is always equal to the logarithm of the rate of flow of air; and that the resistances 1 and 2 are equal. When the bridge is balanced $R_1 = R_2 + R_3$, therefore $R_3 = R_1 - R_2$. Thus $R_3$ is equal to the difference in the logarithms of the rate of steam flow and the rate of air flow, which is the logarithm of the steam-air ratio.

The resistances $R_1$, $R_4$, $R_5$, 1, and 3, together with galvanometer 6 and the current source 10, also form a Wheatstone's bridge. Assuming that the resistance $R_4$ is always equal to the logarithm of the rate of fuel supply, that resistance $1=3$, and that this bridge also is kept balanced by varying the resistance $R_5$, then this resistance $R_5$ is equal to the logarithm of the steam-fuel ratio.

Figure 2:
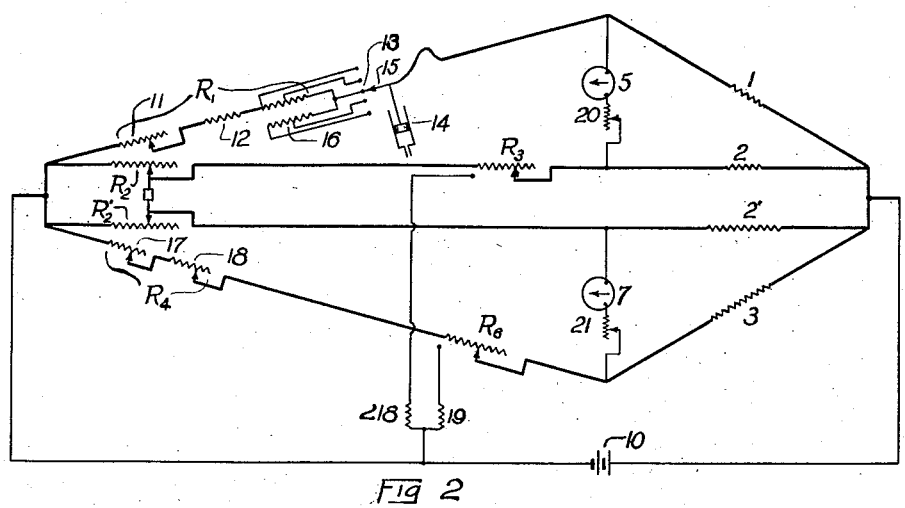
Figure 3:
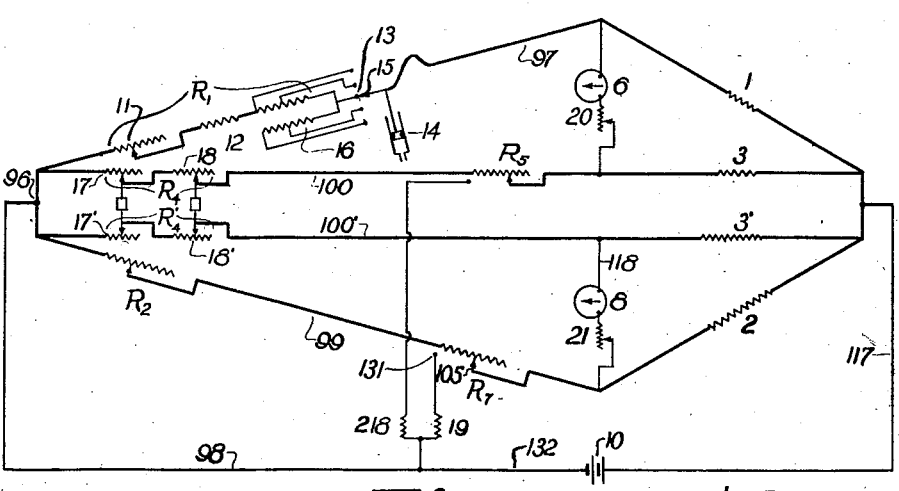

In Figs. 2 and 3, as in Fig. 1, $R_1$ is log steam, $R_2$ is log air, and $R_4$ is log fuel. In Fig. 2, with the bridge balanced, $$R_1 = R_2 + R_3$$
$$1 = 2$$

and $$R_2' = R_4 + R_6$$
$$2' = 3$$

$R_2$ and $R_2'$ are constructed integrally so that they are always equal. Inspection of the figure shows that in this case the resistance $R_3$ equals the logarithm of the steam-air ratio, and that the resistance $R_6$ equals the logarithm of the air-fuel ratio.

In Fig. 3, with the bridges balanced, $$R_1 = R_4 + R_5$$
$$1 = 3$$
$$R_4' = R_2 + R_7$$
$$3' = 2$$

The contact arms of $R_4$ and $R_4'$ are constructed to move together, so that the resistances are always equal. Inspection of this figure shows that $R_5$ equals the logarithm of the steam-fuel ratio, and $R_7$ equals the logarithm of the fuel-air ratio.

In these figures the resistance $R_1$ is composed of the variable resistance 11, the fixed resistance 12, and the resistance between 12 and the contact point 13. The resistance thru 12 and to the contact 13 is termed a log factor resistance because it is equal to the logarithm of a factor by which the quantity whose logarithm the resistance 11 is equal to must be multiplied in order to obtain the rate of steam flow. The variable resistance 11 may be a standardized unit which equals the logarithm of a number which is proportional to the rate of steam flow. The factor by which that number must be multiplied in order to obtain the steam flow rate is a constant for any one boiler installation. Multiplication by this constant factor is accomplished by the addition of its logarithm. The fixed resistance 12 thru 13, added in series to the variable resistance 11, results in a total resistance equal to the logarithm of the rate of steam flow.

The log factor resistance may be augmented for an entirely different purpose. The logarithm of one is zero, and zero is the smallest that a resistance can become. Therefore a unit such as $R_3$ can only indicate ratios greater than one. But the introduction of a factor 100 in the steam rate, by the addition of a log factor resistance of 2, lowers the minimum ratio from 1 to 0.01.

Not only the steam flow resistance $R_1$, but also the air and fuel supply resistances $R_2$ and $R_4$ contain log factor resistances. The log factor resistance in $R_1$ has been separated from its variable resistance 11 in order to indicate how changes in boiler pressure are made equivalent to changes in steam rate. Consider the piston 14 acted upon on its under side by the steam pressure, and on its upper side by a loading spring. This spring is adjusted so that at correct boiler pressure the contact lever 15 will be on the contact point 13, and the log factor resistance will have its correct value. As may be inferred from the drawing, an increase in boiler pressure moves the contact lever 15 upwards and part of the log factor resistance is short circuited. A decrease in boiler pressure below the normal moves the contact lever 15 downwards, and part of the additional resistance 16 is added in series with the regular log factor resistance. In this way a rise in boiler pressure is equivalent to a decrease, and a fall in boiler pressure to an increase, in steam consumption. This, obviously, will change the supply of fuel and air in the right direction to bring the pressure back to normal.

It will be noticed that the log coal resistance $R_4$ is shown with two variable resistances 17 and 18. This is for the case of chain grate stokers, in which the coal supply rate is proportional to the speed of the grate and to the coal gate opening, or fuel bed thickness. The functions of other resistances, such as 218, 19, 20, and 21, are described later in this specification.

In the preceding it has been assumed that we have a resistance always automatically equal to the logarithm of the rate of steam flow; a resistance always automatically equal to the logarithm of the rate of air flow; a resistance always automatically equal to the logarithm of the rate of coal feed; and an automatic self balancing Wheatstone's bridge. These will now be described.

Referring to Fig. 4, the air supply is carried by the conduit 24, in which a thin plate orifice 25 is placed. The differential created by this orifice is transmitted to the U tube 26 by the pipes 27 and 28. In the U tube there is the mercury 29, in which is immersed the contact rods 30. These contact rods are connected to the resistance elements of 22, which are contained within the insulation casing 31.

Fig. 5 shows a development of the wiring of the resistance unit. The resistance 22 is tapped off by the rods 30 at increments such that the resistance value up to any one rod is equal to the logarithm of a number proportional to the square root of twice that mercury depression which just uncovers the rod in question. The radical is introduced because the flow velocity is proportional to the square root of the head of mercury. The head is twice the depression in one leg of the U tube. The log factor resistance 23 is included within the connection to the first contact rod so that at zero flow, when the mercury assumes its own level 32 in the U tube, and the contact rods 30 are all short circuited, the total log air resistance becomes zero. The contact rods 30 form a cylinder and their ends form a spiral. The log factor resistance 23 is mounted on the casing 31, so that there need be but one outlet 33, between which and the mercury connection 34 there is existent a resistance equal to the logarithm of the rate of flow of air.

It is to be understood that the differential to be applied to the U tube may be obtained by a Pitot tube, or a Venturi constriction, or by the differential across all or part of the boiler setting, or by an elbow in the air conduit, as well as by an orifice plate of any suitable type. The U tube may be constructed in any form desirable, and if the differential is insufficient to obtain the necessary variations in mercury level a liquid other than mercury may be used, or a small mercury cup may be mounted on top of an inverted bell of large diameter immersed in a water seal, and subjected between its inside and its outside to the differential obtainable. The log factor resistance takes care of such factors as the relative areas of the orifice and the conduit, the coefficient of the orifice, the density of the fluid in the U tube, the distance between successive contact rods, etc., so that the total resistance equals the logarithm of the air rate in any units desired, as pounds per minute. For the wiring arrangement shown in Fig. 2 this will be a double unit, having two resistances and two sets of contact rods immersed in two mercury columns.

Adverting now to Fig. 6, the chain grate drive shaft 34 has fixed to it a light sprocket 35. This, thru chain 36, drives the small sprocket 37 fixed to the shaft 38 which turns the bevel gear 39 which is in mesh with the bevel pinion 40 on the shaft of which the governor 41 is rotatively fixed. The sleeve 42 rotates with the governor 41, but slides axially relative to shaft 43. The ring 44 moves axially with the sleeve 42 because of the collars 45, but does not rotate with them. In the ring are set carbon brushes one of which contacts with the segments 46 which are connected at suitable points to the resistance 18. The other brush contacts with the continuous rod 47, from which the terminal connection 48 is taken. The resistance taps are so chosen that the resistance up to any one segment is equal to the logarithm of a number proportional to that rotative speed of the governor shaft 43 which causes the brush to contact with the segment considered.

The gate 49 of the stoker has fastened to it at any suitable point, the rod 50 which moves the brush contact 51 over the segments 52. These are connected to the resistance 17 at such points that the resistance up to any one segment is equal to the logarithm of a number proportional to the gate opening. Normally the circuit is from the terminal wire 53 to the brush 51, through the logarithmic resistance 17, the wire 54, the log factor resistance 55, the logarithmic resistance 55, the logarithmic resistance 18, thence thru the brushes to the other terminal wire 48. The log factor resistance may be adjusted to include changing the governor speed to grate speed in feet per minute; changing the gate opening to feet; introducing the feet width of the grate; introducing the pounds of fuel per cubic foot; and reducing by a "coefficient of feed" for the stoker. All except the last coefficient may be found by measurement and computation, and the "coefficient of feed" may be found by calibration of like stokers with like fuel, or calibration of the actual stoker considered. If desired, the entire log factor resistance may be determined and adjusted by calibration of the stoker on which it is to be used. The first segment 56 of the contacts 46 is connected by the wire 57 to the terminal 53, so that when the chain grate stops the total log coal resistance becomes zero.

It is patent that the governor may be geared to any shaft which rotates at a speed proportional to the grate speed. Thus in Fig. 14 the stoker is considered driven by an independent motor 201, and the governor 41 is geared to the motor shaft. The governor need not be of the flyball type, for any tachometer that can be arranged to vary a resistance may be used.

If an overfeed or an underfeed stoker is used the coal feed is considered proportional to the speed of the crankshaft driving the plungers. In the case of liquid or gaseous fuels, any suitable metering arrangement that can alter the value of a logarithmic resistance may be adapted to this use, including in some cases the thin plate orifice as already described. If the wiring arrangement shown in Figure 3 is used, then each of the resistances 17, 18, in Fig. 6 are in duplicate, and the moving elements 44 and 51 move two brushes over two parallel rows of contact segments 46 and 52.

Steam leaves the boiler superheater and goes to the header thru the pipe 58 shown in Fig. 7. In this pipe is placed a thin plate orifice 59, the differential created by it being transferred to the U tube 60 by the pipes 61 and 62 thru the inverted tubes 63 and 64. The inverted U tube arrangement is used to float a non-conducting oil 65 around the part of the contact rods above the mercury surface, to prevent their being short circuited by a medium other than the mercury 92, 67.

The logarithmic resistance 11 is contained in the casing so marked. Its contact rods 66 are, like the rods 30 in Fig. 4, just short circuited when the mercury 92, 67, assumes its own level. It differs from the resistance unit in Fig. 4 only in that its log factor resistance is outside of the U tube. In connection with Figs. 1, 2, and 3 it was pointed out that part of this log factor resistance was used in a pressure resistance unit for pressure regulation. This necessitates an external connection from the first contact rod 68, Fig. 7, in order that at zero steam flow, when the contact rods 66 are short circuited, the factor resistance may be short circuited also. The outlet 69 is connected to the beginning of the logarithmic resistance 11, and the outlet 70 is connected to the shortest contact rod 68.

The resistance unit 74 with the contact rods 75 forms no part of this invention, and need not be described in detail. It is used in connection with an ammeter or a resistometer to indicate, at a distant point, the rate of flow of steam thru the pipe 58. An increased flow produces an increased pressure differential, which raises the surface of the mercury 67, which short circuits more of the contact rods 75, thus short circuiting more of the resistance 74, and permitting an increased flow of current to pass thru the resistance and the ammeter at the distant point. A steam measurement is required, but how that measurement is made is immaterial to the novelty of this invention. The third resistance unit 73, will be described subsequently.

The pressure resistance unit is shown in Fig. 8. It is connected to the steam pipe 58 thru the valve 78, the radiator 79, and the insulation connection 80.

In the unit shown the pressure is reduced by the small piston 14 driving the large piston 81. The space between the pistons is open to the atmosphere thru the vent hole 82. The piston 81 supports the mercury 15 in a column 83 of suitable length, which is terminated by the cylinder 84. Supported in this cylinder is the resistance unit 85 which contains part of the log factor resistance of the steam logarithm resistance $R_1$, and that much resistance again, shown as resistance 16 in Fig. 3. When the mercury column 15 is half way up the contact rods 86 the resistance 16 is short circuited, and the steam log factor resistance has its proper value.

The resistance unit 85 is threaded to mate the threaded rod 87, which is turned by the handle 88. The unit 85 is prevented from turning by the rod 89. Rotation of the handle 88 raises or lowers the unit 85 until it is set to maintain the proper boiler pressure. Extreme pressure excess, without spilling of the mercury, is permitted by the standpipe 90. Lead 91 is taken from the beginning of, and lead 70 from the middle of, the pressure resistance. The connection to the variable switch arm 15, Fig. 3, is by means of the lead 93, Fig. 8, grounded to the mercury 15.

Figure 14:
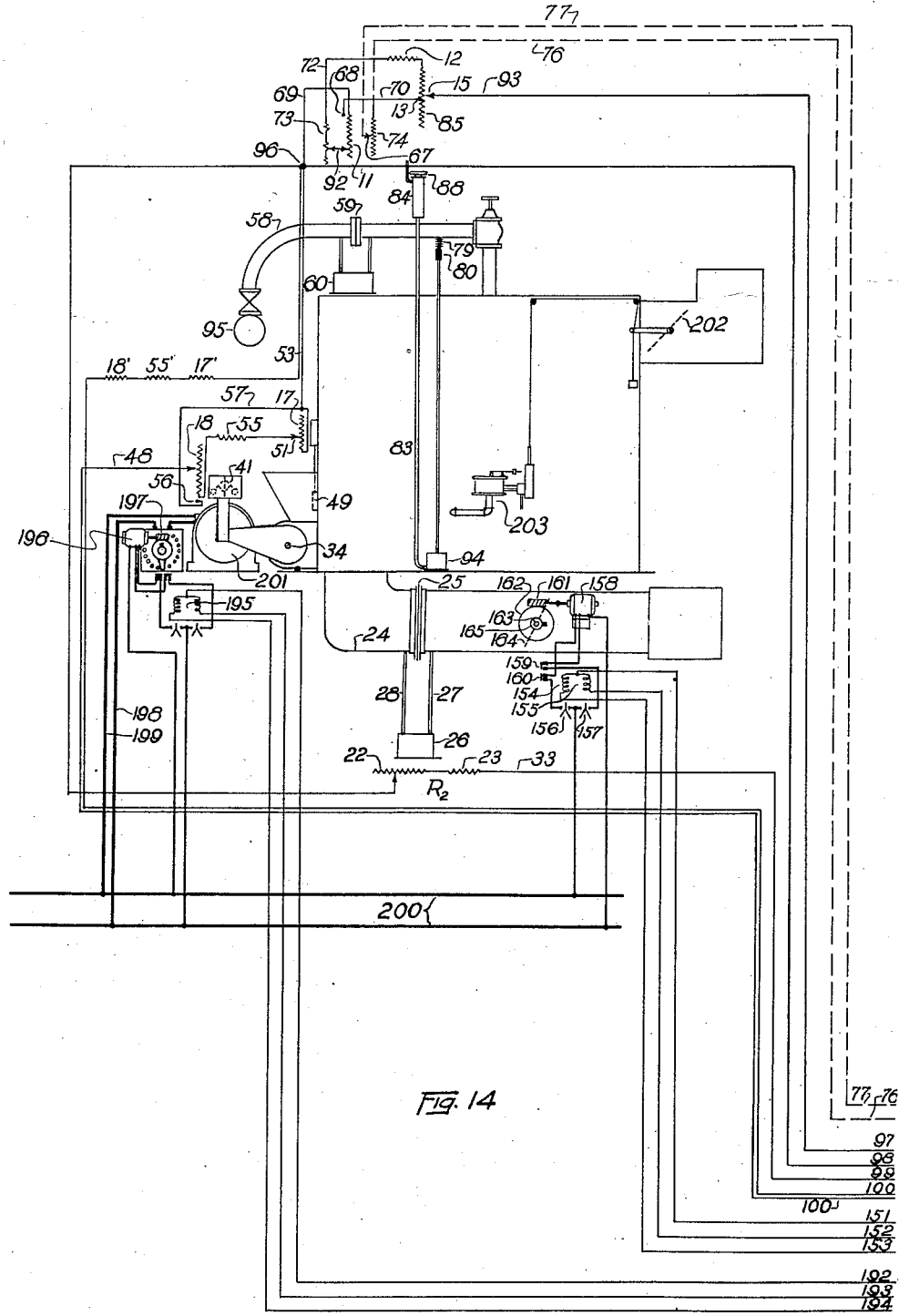
Fig. 14 is a diagram of the wiring in the boiler room.

The radiator 79 serves to condense steam to insure water contact with the piston 14. Where boiler pressures are moderate no pressure reduction need be made, the mercury head itself counteracting the boiler pressure. Such an arrangement is shown in Fig. 14 where 83, 84, is the column, and 94 is merely a mercury reservoir to take from or supply to the column 83, 84 the necessary mercury to take care of pressure changes, or a total boiler shut down. Mercury need not be used, if it is thought preferable to use a contact arm moved over contact segments by a spring loaded piston, as was suggested in connection with the description of Figs. 1, 2, and 3.

The manual pressure adjusting handle 88, Fig. 8, is used, not only to set the initial pressure, but also to make several boilers on one header share their loads as desired. This manual pressure adjustment is raised on those boilers found by the steam flowmeter records to be lagging.

Friction in a pipe line varies approximately as the square of the velocity of the fluid flowing therein. Increased load on a steam consuming unit, making it draw more steam, results in it receiving steam at a decreased pressure. In cases where constant pressure at the steam consuming unit is extremely desirable, and only one boiler is supplying that unit, the pressure resistance unit may be mounted at the consuming unit instead of at the boiler. Then at increased loads the boiler pressure will be automatically increased to overcome the increased pipe friction loss.

The same object, with one or several boilers, may be attained by automatic variable regulation for pressure at the boiler. To this end there may be put in series with the regular pressure resistance unit a small variable resistance unit affected by the rate of use of steam. This is the function of the resistance unit 73 shown in Fig. 7. It is seen that an increased steam consumption causes a greater mercury depression, increasing the amount of effective resistance in the unit 73, and this resistance is in series with the other steam resistances. When the pressure is increased to the point where the decrease in the pressure resistance 85 Fig. 8 equals the added resistance 73 Fig. 7 because of the increased flow, the factor resistance is once more at its correct value, and the coal and air supply is governed only by the rate of use of steam, this supply being necessary and sufficient to maintain the pressure. This compensatory pressure adjustment is an automatic pressure regulation as a function of the rate of use of steam.

The relation of these various steam resistances may best be summarized by a reference to the complete wiring diagram given in Fig. 14. Figs. 7 and 8 should also be referred to, as the reference numbers are the same for like parts. Adverting to these three figures, the steam pipe 58 leading to the header 95 has in it the thin plate orifice 59 and connected to it the pressure column 83. Cooperating with the thin plate orifice 59 is the mercury U tube 60. The resistance units are shown separated for clearness. The logarithmic steam resistance unit 11 and the variable pressure resistance unit 73 are in the depression leg of the U tube 60. The resistance 74 is in the other leg of the U tube 60, and has separate connecting wires 76 and 77, which lead to the ammeter of an electric flowmeter. The pressure resistance 85 is in the mercury column 84. The log factor resistance, except for the part of it which is one half of the pressure resistance 85, is shown at 12. In each case the moving mercury surface is represented by an arrow.

The corner of the compound Wheatstone's bridge is shown at 96, and starting from this point it is seen that the log steam resistance 11, the variable pressure resistance 73, the factor resistance 12, and the pressure resistance 85, are all connected in series. If the rate of steam flow increases the mercury 92 in the depression leg of the U tube 60 is lowered, and the resistance 11 is increased. If the steam pressure falls, the mercury 15 drops, and there is increased resistance as tho there were increased steam flow, until the pressure comes back to normal. If the steam flow increases enough so that an increased boiler pressure is needed, or in other words, if the mercury 92 is depressed enough to cut in some more of the resistance 73, then there is increased resistance both because of the increased steam flow, and because of the increase in the variable pressure resistance 73. The effect is as tho there were a steam rate increase still greater than that which really exists. An excess of fuel and the equivalent amount of air for best combustion is supplied, and this results in an increase in boiler pressure, which raises the mercury 15 in the column 84 until a new equilibrium is attained, which is when the pressure resistance 85 is decreased as much as the variable pressure resistance 73 is increased.

If the steam flow ceases altogether, and the mercury in the U tube assumes its gravity level, the variable pressure resistance 73 is short circuited. The mercury 92 also reaches the shortest contact rod 68 which is connected by the wire 70 to the center 13 of the pressure resistance 85. This short circuits the log factor resistance 12 plus the upper half of the pressure resistance 85. With the boiler pressure at its proper amount so that the mercury 15 short circuits the lower half of the pressure resistance 85 then all of the steam resistance is reduced to zero. If the boiler pressure falls then some resistance will be cut in, so that the device, wired as shown, will tend to maintain boiler pressure. If the boiler is to be shut down the entire bridge circuit may be opened by a switch located at the remote control panel, on which is also located the recording and automatic remote control instrument.

Figure 9:
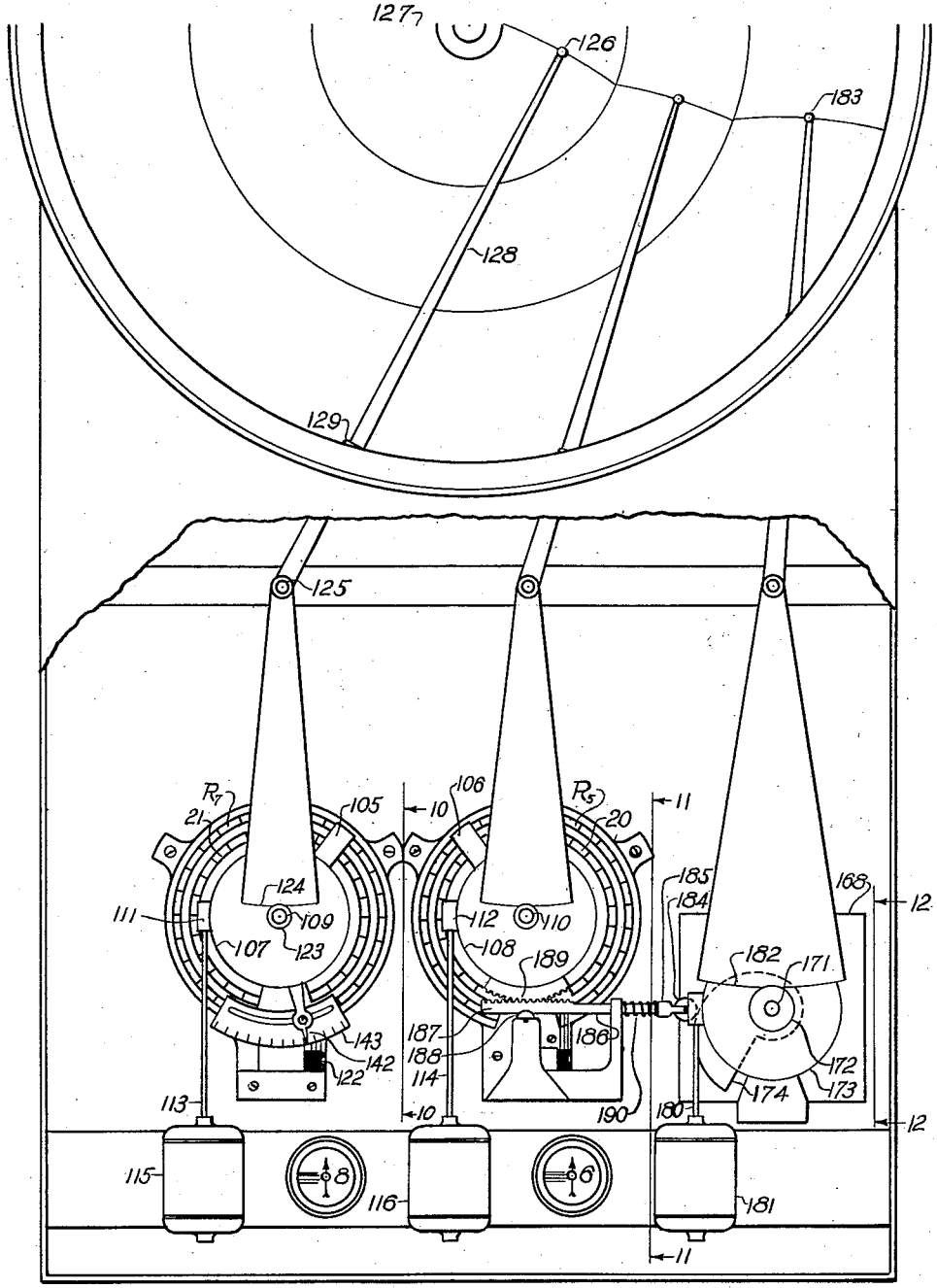
Fig. 9 is a drawing of the recording instrument and automatic control unit.
Figure 15:
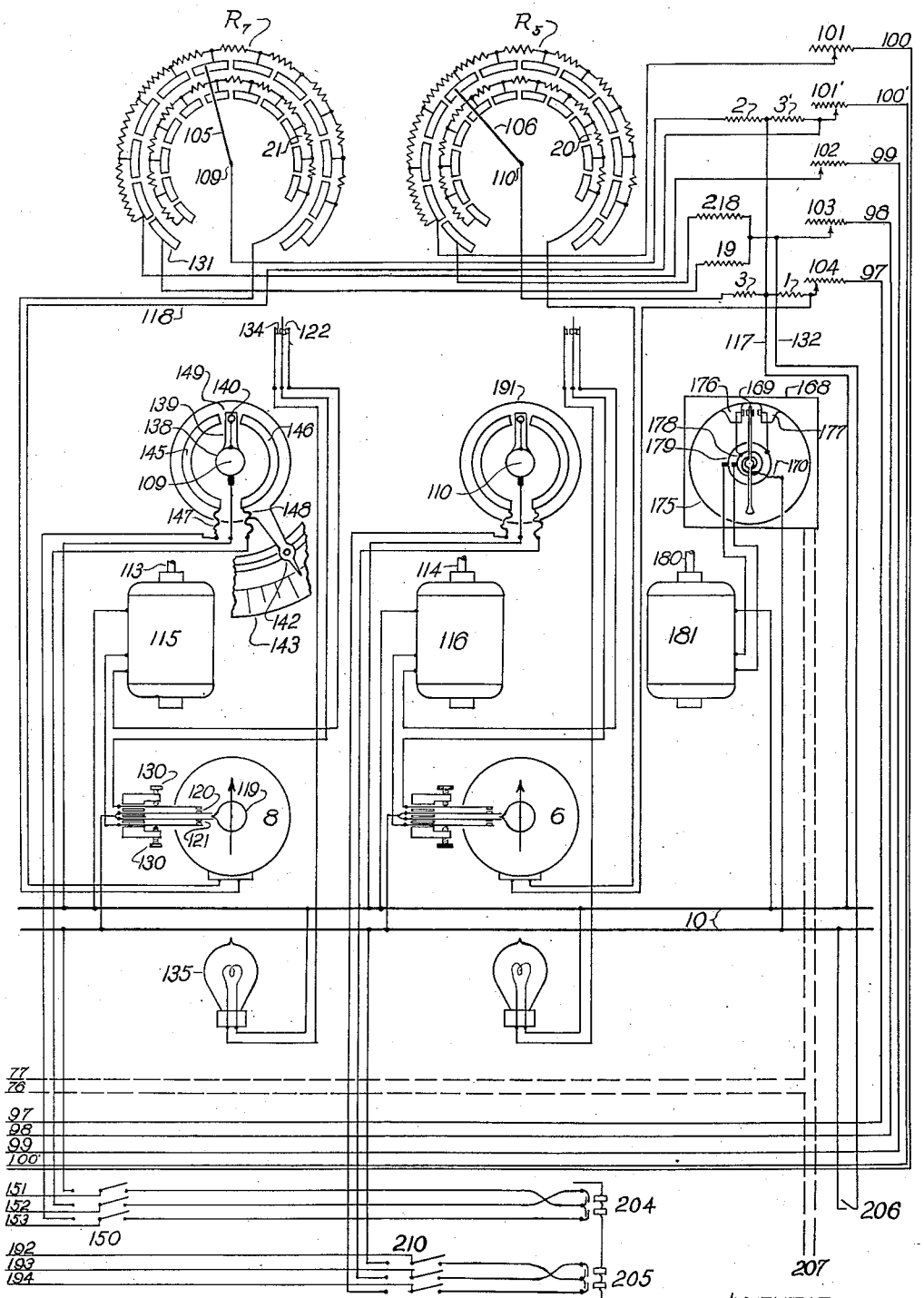
Fig. 15 is a diagram of the wiring on the remote control panel and in the recording instrument.

This instrument is shown in Fig. 9, and Fig. 15 is its wiring diagram. The instrument is described for the arrangement shown in Fig. 3, and the slight changes needed to use the wiring in Fig. 1 or Fig. 2 are explained later. Turning back to Fig. 3 it is seen by the description so far given that $R_1$ is automatically equal to log steam, $R_4$ and $R_4'$ are automatically equal to log coal, and $R_2$ is automatically equal to log air. Running from these we have four wires, 97, 100, 100', and 99 respectively, and a fifth wire 98 from their common junction 96. These wires are presumed to continue from the boiler, as shown in Fig. 14 to the remote control panel, as shown in Fig. 15. There they are first connected to the fixed adjustable resistances 101, 101', 102, 103, and 104. These resistances have a value equal to the greatest line resistance likely to be found between the instrument and the common junction 96, and each is then reduced by the actual resistance of its connected line when installed. The total line resistance in each leg of the Wheatstone's bridge in this way is made equal to a predetermined constant. The resistance of the wiring within the instrument itself is considered negligible.

Referring temporarily to Fig. 9, the galvanometers for the two Wheatstone's bridges are 8 and 6, the contact segments for the logarithmic resistances which are to be varied to bring the bridge to balance are shown as $R_7$ and $R_5$, the switch arms varying these are 105, 106, and they rotate upon actuation from the worm gears 107, 108, thru the shafts 109, 110. These worm gears are in mesh with the worms 111, 112 on the spindles 113, 114 of the reversing instrument motors 115, 116.

Discussing the lower, or coal-air Wheatstone's bridge, with reference to Figures 3 and 15, it is seen, in both, that the wire 99 goes to the logarithmic ratio resistance $R_7$. From this resistance connection is made with the fixed resistance 2, and the variable resistance 21 (the switch lever 105 contacts with the segments of both $R_7$ and 21). The fixed resistance 2 is joined to the equal fixed resistance 3', and to the current source 10 by the wire 117. The other end of the resistance 3' is connected with the line wire 100' (thru the fixed adjustable resistance 101' in Fig. 15) and to the galvanometer 8 by the wire 118. The second terminal of this galvanometer is connected to the resistance 21, completing the bridge.

Variation of the air or coal rate causes an unbalance of the bridge, which results in a deflection of the galvanometer 8. Rotation of the cam 119 of the galvanometer causes contact of the points 120 or 121, and assuming that the limit switch points 122 are in contact, as is normally the case, that circuit between the bus 10' and the reversing motor 115 which causes the motor 115 to rotate the switch arm 105 in the direction which varies the logarithmic resistance $R_7$ so as to bring the bridge to balance, is closed. When the bridge is balanced the galvanometer 8 no longer deflects, the motor circuit is opened, and the switch arm 105 remains at rest.

The resistance $R_7$ is tapped at logarithmic increments, so that the angle of rotation of the switch arm 105 is proportional, to a uniform scale, to the ratio of which $R_7$ is the logarithm.

Referring to Fig. 9, the shaft 109 carries the pinion 123 which engages the gear sector 124. This pivots about the spindle 125 and imparts its movement to the stylus 126, which records on the moving chart 127 a graphic record of the coal-air ratio. The pen arm 128 is hinged at 129 to permit change of record charts. These pen arms may extend downwards instead of upwards from their pivots, the upper half of the record chart 127 being then in front of the interior of the instrument now exposed, so resulting in a more compact instrument.

The resistance $R_7$ is tapped, not at equal, but at logarithmic increments in order to obtain the ratio record to a uniform scale. This fact makes necessary the use of the resistance 21, which is in series with and serves to vary the sensitivity of the galvanometer 8. The adjusting screws 130, Fig. 15, are used to space the contacts 120, 121 far enough apart to prevent hunting by the switch arm 105 over those contacts between which the smallest element of the logarithmic resistance $R_7$ is connected. In this position none of the resistance 21 is in series with the galvanometer 8, but in other positions, where larger elements of the resistance $R_7$ are involved, such a portion of the resistance 21 is connected in series with the galvanometer 8 as is sufficient to decrease its sensitivity, or to be more exact, the applied potential, the amount necessary to prevent hunting.

The overall resistance of the bridge from wire 98 to wire 117 (Fig. 3) varies, depending on the boiler load, and this changes the effect on the galvanometer 8 of a bridge unbalance of a given amount of resistance. The resistance 21 is designed to allow for this factor, as well as the one previously mentioned.

The resistance from 98 to 117 also varies, for different installations, according to the value of the factor resistances, but this overall resistance is brought within a predetermined design limit. A very large boiler has a large steam output, and large fuel and air inputs. These give large values to the log factor resistances in the log resistances $R_1$, $R_4$, $R_4'$, and $R_2$, for the variable parts are standardized units. But the ratios are approximately the same as those for a small boiler, hence the logarithmic resistances $R_5$ and $R_7$ are sufficient in range for all sizes of boiler. To reduce the overall resistance from 98 to 117, exclusive of the variable parts of the logarithmic resistances, to a predetermined standard all of the factor resistances are reduced by an equal necessary and sufficient amount. Mathematically, this amounts to cancelling a common factor in the numerator and denominator of a fraction, or ratio. Electrically, this expedient serves to keep the current flow thru the bridge within prescribed limits.

The ratio device is sometimes subjected to ratios beyond its design limits. If the coal supply stops the ratio becomes zero; if the air supply stops the ratio becomes infinity. If the coal supply ceases the switch arm 105 Fig. 15 turns counterclockwise, reducing $R_7$, in an attempt to balance the bridge. $R_7$ is reduced to zero but the bridge is still off balance because the air supply is, ordinarily, not reduced to zero. In Fig. 3 $R_4'$ is zero, $R_7$ is zero, but $R_2$ is not; and must be short circuited to permit bridge balance. The bridge unbalance serves to bring the switch arm 105 onto the contact 131, so disconnecting the wire 99 and joining in its stead the wire 132 thru the resistance 19 which is equal to the sum of the line resistances of the wires 98 and 99, or is twice any one of the fixed adjustable resistances 101—104, following out this same wiring in Fig. 15. The bridge is then balanced, and the switch arm remains at rest. The moment the coal supply is renewed the ratio becomes infinity, the switch arm turns clockwise, and then as it leaves contact segment 131 the correct log air resistance is again placed in circuit.

If the air supply stops the ratio becomes infinity. The switch arm 105 turns clockwise and presses the insulated spring lever 133 Fig. 13, opening the contacts 122 and closing the contacts 134. In Fig. 15 it is seen that opening the contacts 122 opens one of the circuits to motor 115, and this is the circuit that rotates the switch arm 105 in the clockwise direction, so that it then remains in place. The bridge is still unbalanced, and the current which normally would go to the motor 115 now goes thru the closed contacts 134 to the alarm 135, which, of course, may be a red light, a bell, or any combination of suitable alarms.

The ratio unit $R_5$ is similar to $R_7$ already described. It is recalled that zero coal makes a zero coal-air ratio, and gives no alarm, but zero coal makes an infinite steam-coal ratio, which does give alarm notification. The alarm energized shows whether it is the coal or the air supply that has stopped. Notification of wiring trouble is also given, as an open circuit is infinite resistance, and a short circuit is zero resistance, either of which results in an alarm being given.

Attention is now called to Fig. 10, which is an elevation on the line 10—10 in Fig. 9 looking in the direction of the arrows. The motor 115 turns the spindle 113, a worm on which meshes with the worm gear 107. This turns with it on its shaft 109 the pinion 123, the switch arm 105 with its insulation mounting 136, the slip rings 137 and 138, and the brush arm 139 which carries the brush 140. The slip ring 137 is connected to the switch arm 105, which cooperates with the contact segments of both the logarithmic resistance $R_7$ and the sensitivity varying resistance 21. The slip ring 138 is connected to the brush 140.

The insulation disk and bushing 141 is free on the shaft 109, and is kept from rotating by the pointer 142 locked to the scale 143 by the thumb screw 144. The face of the insulation disk 141 has two contact arcs 145 and 146 (Fig. 15) which are connected to the flexible leads 147 and 148. The pointer 142 is locked to the scale 143 at such a point that the space 149, between the contact arcs 145 and 146, is in contact with the brush 140 when the stylus 126 (Fig. 9) indicates the ratio desired. In actual design, of course, the scale 143 is marked in advance, and it may be graduated in pounds of fuel per pound of air, or its reciprocal, pounds of air per pound of fuel.

When the ratio of fuel to air is incorrect the brush 140 (Fig. 15) comes into contact with the segment 145 or 146. This closes the circuit from the bus 10' to the lead 147 or 148. The switch 150 remains closed to the left during operation by automatic control, so connecting the leads 147, 148, and the bus 10' to the three wires 151, 152, 153, which go to the boiler room. Referring to Fig. 14, the three wires go to the relay coils 154 and 155, which, when energized, attract upwards the contact cones 156 and 157. These close the ahead or reverse circuits from the bus 200 to the reversing motor 158, thru the brushes 159, 160.

The motor 158 drives the worm 161 which engages the worm gear 162. This is fixed to the damper shaft 163 which turns the damper 164 in that direction which changes the air supply rate to correct the coal-air ratio.

To prevent the damper 164 from overtravelling, and subsequent hunting for position, the relay 154, 155 may be self interrupting, reclosing occurring only after a time lag, thus allowing time for the effect of each damper change on the air supply to become recognized at the automatic control instrument.

The remote control instrument may then be equipped with magnetic contactor switches between wire 151 (Fig. 15) and wires 152 and 153, to prevent brush 140 from opening the highly inductive relay circuit, and consequent burning of the brush and segments.

The brushes 159 and 160 (Fig. 14) bear on the drum 165, which is fixed to the damper shaft 163. These coact to form a motion limit switch, as is more clearly shown in Figs. 16, 17, and 18. In Fig. 16 the two brushes 159 are connected by the conducting plate 166, and the two brushes 160 by the plate 167. These conducting plates are imbedded in the insulation drum 165, which is fixed to the damper shaft 163. Fig. 18 is a development of the surface of the drum 165, and it is seen that each plate is 90° long, but that they are slightly staggered relative to one another. When the damper 164 (Fig. 14) reaches its fully open position the brushes in series with the opening circuit of the motor 158 leave their conducting plate, and the damper can go no further. The brushes in series with the closing circuit of the motor are still in contact with the other conducting surface, allowing the damper to close, when conditions so change that the ratio control signals a decreased air supply. When the damper reaches its closed position the motor closing circuit is opened, but the motor opening circuit remains closed.

The best fuel-air ratio, for a given fuel and boiler, is a constant. The steam-fuel ratio, however, is not a constant. For any one boiler, and with a constant fuel-air ratio maintained, it is a variable dependent only on the load being carried by the boiler. If the efficiency curve of the boiler is known the steam-fuel ratio at various boiler outputs is readily computable.

To obtain a variable ratio as a function of the steam rate we must first have an element responsive to the steam rate. Adverting to Fig. 12, the ammeter of an electric flowmeter is represented by 168 having as an indicator the arm 169. The type of flowmeter used is unimportant, so long as it has a pointer 169 responsive in a known manner to the steam rate. To this special pointer arm a flexible lead 170 is connected.

The shaft 171 is placed concentric with the shaft of the meter, and fixed to it is the pinion 172, the worm gear 173, the cam 174, the insulation disk 175 with the projections 176, 177 and the slip rings 178, 179. The spindle 180, of the reversing instrument motor 181 carries a worm which meshes with the worm gear 173.

With this construction in mind, Fig. 15 is next referred to. The pointer 169 has contact points adapted to touch the contact points on the projections 176, 177. When the pointer 169 touches a contact it closes the circuit between the bus 10 and the reversing motor 181 which rotates the disk 175 in that direction which tends to separate the points from their contact. The result is that the disk 175 follows the pointer, reproducing its every motion, but with greatly increased torque.

Referring to Fig. 9, the shaft 171 carries the pinion 172 which engages the gear sector 182. Stylus 183 then records the rate of steam flow. The cam 174 imparts motion to the cam follower 184, carried by the yoke 185, on the end of the rod 186. The other end of this rod is fixed to the rack 187, riding on the wheel 188 and engaging the gear sector 189. The light spring 190 keeps the follower 184 in contact with the cam 174.

Fig. 11 is an elevation taken on the line 11—11 in Fig. 9 looking in the direction of the arrows. It differs from Fig. 10 only in that the control disk 191, instead of being positioned by a fixable ponter, is positioned by the gear sector 189. Knowing the angular position of the cam shaft for given steam rates from the boiler efficiency curve, the cam 174 is laid out and made as required for each type of boiler.

Referring to Fig. 15, the three control wires for the fuel go to switch 210, which, like switch 150, is normally closed to the left. Control wires going to the boiler room are then 192, 193, and 194. Following these wires to the boiler room, Fig. 14, it is seen that they are connected with the relay 195. This switches current from the bus 200 to the reversing motor 196 which, after a worm drive reduction, rotates the switch arm of the rheostat 197. Limit switch brushes are provided on the rheostat shaft, just like the brushes 159, 160 on the damper shaft, to keep the rheostat arm within its useful arc of rotation. The rheostat 197 is in series with the wire 198, which, together with wire 199, carries the necessary electrical energy from the bus 200 to the stoker drive motor 201.

It is to be appreciated that a remote control electric motor may be used in any way found desirable. It may be used to throttle steam turbines; to alter their mean governor positions; to shift the speed relations in variable speed reductions; to vary the gate opening of a chain grate stoker; to vary the speed of pole changing A. C. motors; to control forced or induced draft fans; to change the rate of feed of powdered, oil or gaseous fuels by the control of valves or pumps; as well as dampers as has already been described.

The induced draft is varied by the damper 202 (Fig. 14). This is controlled by any suitable known device, 203, which maintains a constant pressure in the furnace. This pressure is usually kept slightly negative so that air leakage will be inwards, and to prevent damage to the furnace setting. It is clear that the amount of air may be changed by regulation of the induced draft, and the unit 203 be used to reduce the forced draft sufficiently to keep the furnace pressure slightly negative.

This balanced draft system is not satisfactory in many installations having manual or other types of automatic control. With a given forced draft damper position, consider the occurrence of a hole in the fire. The rush of forced draft air increases the furnace pressure. To reduce this the induced draft damper opens. But this causes an increased rush of forced draft air thru the low resistance fuel bed, consuming the small amount of fuel there, and aggravating the bad condition. Balanced draft, used in connection with this invention, has no such defect. The amount of air is actually measured, and it is kept down to the correct amount for the existing fuel rate regardless of how low the fuel bed resistance in one spot may become. A hole in the fire tends to increase the air supply, but this increased supply is measured, and almost instantly alters the recorded fuel-air ratio to an incorrect value. Simultaneously with this change in ratio the remote control causes a closing of the forced draft damper which brings the air supply back to normal.

The wiring arrangement shown in Fig. 1 gives a steam-air and a steam-coal ratio. For this arrangement both ratios are variable, and referring to Fig. 9 the rack 187 is continued along until under the shaft 109, and a gear sector similar to 189 replaces the pointer 142. Both ratios then vary together. The ratio of fuel to air, altho not measured and not recorded, will be a constant as in the embodiment described.

The wiring arrangement shown in Fig. 2 gives a steam-air and an air-coal ratio. For this arrangement the first ratio is variable and the second is fixed. In this case, referring to Fig. 9, the instrument remains unchanged. The center stylus, of course, will record the steam-air ratio, and the third stylus, 126, will record the air-coal ratio.

The log factor resistances introduced to shift the ratio decimal points to make the ratios greater than unity are different for these different arrangements. For instance the coal-air ratio must be multiplied, whereas its reciprocal, the air-coal ratio, being naturally greater than unity, needs no increase.

By throwing the switch 210 (Fig. 15) the push buttons 205 may be used to increase or decrease the fuel supply. The air supply will accommodate itself to the new fuel supply. By throwing the switch 150 the push buttons 204 may be used to change the air rate.

The switch 206 may be opened in case of a boiler shut down. The wires 207 serve to complete the circuit of an electric type of steam flowmeter if such is used, and form no part of the present invention.

With attention to the special problems involved either direct or alternating current may be used at the current source 10, Fig. 3, and it need not be a constant potential source.

I do not wish to be limited to steam generating boilers, for the invention is equally applicable to the control of fuel and air ratios for best combustion even where the heat is not used for steam generation. I also do not wish to be limited to the use of resistances and electrical circuits just as described in the preceding specification. What I believe is my invention is defined in the annexed claims.

What I claim is:

1. In combination, means to move a combustion substance at a variable rate, an electrical circuit, a source of current therefor, and measuring means responsive to the rate of movement of said substance for changing the rate of flow of current in said circuit an amount dependent upon the logarithm of a number proportional to the rate of motion of the substance.

2. In combination, means to move a combustion substance, an electrical circuit of variable impedance, and measuring means responsive to the rate of movement of said substance for varying the impedance of said electrical circuit to a value dependent upon the logarithm of a number proportional to the rate of motion of said substance.

3. In combination, means to move a combustion substance, an electrical circuit including variable resistance, and measuring means responsive to the rate of motion of said substance for automatically varying the resistance of said circuit to maintain said resistance at a value dependent upon the logarithm of a number proportional to the rate of motion of the substance.

4. In combination, a stoker, an electrical circuit of variable impedance, and means including a tachometer responsive to the speed of said stoker for varying said impedance, said means being arranged to maintain said impedance at a value dependent upon the logarithm of a number proportional to the stoking speed of said stoker.

5. In combination, a fuel feeding means having a fuel gate, means to vary the opening of the fuel gate, an electrical circuit for automatically controlling the opening of the fuel gate including a variable impedance, and means responsive to movement of said fuel gate for adjusting said impedance to maintain its magnitude at a value dependent upon the logarithm of a number proportional to the opening of said fuel gate.

6. In combination, means to feed a substance at a rate measured by a plurality of factors, an electrical circuit including a plurality of variable impedances, and measuring means for maintaining said impedances each at varying quantitative values dependent respectively upon the logarithms of each of the factors which measure the rate of feed of the substance.

7. In combination, a chain grate stoker, a tachometer responsive to the speed of said stoker, an impedance arranged to be varied by said tachometer to be maintained thereby at a value dependent upon the logarithm of a number proportional to the speed of said stoker, a fuel gate, an element responsive to the opening of said gate, an impedance varied by said element and maintained thereby at a value dependent upon the logarithm of a number proportional to the amount of opening of said gate, and an electrical circuit including said impedances.

8. In an automatic combustion control, a steam boiler, an electric circuit and a source of current therefor, means responsive to the rate of use of steam from said boiler for logarithmically varying the current flow in said circuit, and means responsive to the steam pressure in said boiler for varying the current flow in the same circuit in the opposite direction.

9. In combination, a steam boiler, means responsive to the rate of flow of steam from said boiler, a second means responsive to the steam pressure in said boiler, and an electrical circuit of variable impedance, said flow rate responsive means being arranged to vary the impedance of said circuit in accordance with the logarithm of a number proportional to said steam flow rate, and said pressure responsive means being arranged also to vary the impedance of said circuit.

10. In combination, a steam boiler, means responsive to the rate of flow of steam from said boiler, a second means responsive to the steam pressure of said boiler, an electrical circuit including variable impedances one of which is so varied by said flow rate responsive means as to be dependent upon the logarithm of a number proportional to the steam flow rate, another of which is differently varied by said flow rate responsive means, and another of which is varied by said pressure responsive means.

11. In combination, a fluid conveying conduit, an electrical circuit including two variable electrical impedances connected in series, means responsive to the rate of flow of the fluid for varying one of said impedances, and means responsive to the pressure of said fluid for varying the other of said impedances.

12. A conduit for the flow of fluid, means for producing a pressure differential incident to the flow of fluid in said conduit, an electrical circuit including a plurality of variable impedances, and means responsive to said pressure differential for varying the quantitative values of said impedances, said means being arranged to maintain the value of one of said impedances at a value dependent upon the logarithm of a number proportional to the rate of flow of said fluid.

13. In combination, a fluid conveying conduit, an electrical circuit including three variable electrical impedances connected in series, means responsive to the rate of flow of the fluid for varying two of said impedances, said means being arranged to maintain one of said two impedances at a value dependent upon the logarithm of a number proportional to the said rate of flow, and means responsive to the pressure of said fluid for varying the third impedance.

14. In combination, a boiler and furnace therefor, an electrical circuit, means responsive to the boiler pressure for varying said electrical circuit, means for varying the rates of supply of fuel and air to the boiler furnace, said last-named means cooperating with said electrical circuit to alter the fuel and air rates to said furnace to tend to keep the fluid pressure in said boiler at a predetermined value, and means responsive to the rate of flow of the fluid from the boiler to automatically vary said predetermined value.

15. Means to maintain at a predetermined value the fluid pressure in a boiler having a boiler furnace comprising an electrical circuit, means to vary the rates of supply of fuel and air to the boiler furnace, said means being responsive to changes in the impedance of said electrical circuit, means responsive to variations in the fluid pressure of said boiler for varying the impedance of said circuit, and means responsive to the rate of flow of the fluid from said boiler for oppositely varying the impedance of said circuit in logarithmic proportion.

16. Means to vary the fractional portion of a total steam supply generated by one of a plurality of boilers comprising means to maintain a predetermined steam pressure at the said boiler, and means to adjust said predetermined pressure relative to the average pressure so as to vary the apportionment of the load.

17. Means to automatically maintain the steam pressure of a boiler at a pressure varied in a predetermined manner dependent on the rate of use of steam comprising an electrical circuit, means responsive to a change in the impedance of said circuit for varying the rates of supply of fuel and air to the boiler furnace, means responsive to variations in the existing steam pressure of the boiler for varying said impedance, and means responsive to the rate of flow of steam from said boiler for varying said pressure varied impedance.

18. In an automatic combustion control, a network of electrical conductors comprising a plurality of Wheatstone's bridges, logarithmically varied impedances in each of said bridges, and means associated with each of said bridges for automatically varying the impedance of a branch thereof in order to keep them in balance.

19. In an automatic combustion control the operation of which depends on the rate of use of steam, means to make an undesired rise or fall in boiler pressure equivalent respectively in their effects on said control to a decrease or increase in the rate of use of steam comprising an element varied as a logarithmic function of the rate of use of steam, another element varied as a function of the boiler pressure, and means causing said elements to cooperate differentially.

20. In an automatic combustion control the operation of which depends on the rate of use of steam, means to make the steam pressure dependent on the rate of use of steam and to make a change from the desirable steam pressure equivalent in its effect on said control to a change in the rate of use of steam until such pressure change ceases comprising an impedance varied as a function of the rate of use of steam, an impedance varied from a normal value in opposite sense as a function of the boiler pressure, and means to vary said normal impedance value according to the rate of use of steam.

21. In an automatic combustion control, means to obtain boiler operation ratios, means to compare the actual ratios with desirable ratios, means to automatically vary said desirable ratios in a predetermined manner, and means to set corrective means in operation upon deviations for said actual ratios from said desirable ratios.

22. In an automatic combustion control, means to obtain two boiler operation ratios, means to compare the actual ratios with desirable ratios, means to fix one of said desirable ratios at a constant value, means to automatically vary the other of said desirable ratios in a predetermined manner, and means to set corrective means in operation upon deviations of said actual ratios from said desirable ratios.

23. In an automatic combustion control, means to obtain a boiler operation ratio, means to automatically compare the actual ratio with a desirable ratio, means responsive to the rate of flow of steam to automatically vary said desirable ratio in a predetermined manner, and means to set corrective means in operation upon deviation of said actual ratio from said desirable ratio.

24. In combination with a boiler, measuring means responsive to the rate of flow of steam, measuring means responsive to the pressure of the steam, measuring means responsive to the rate of supply of fuel, and measuring means responsive to the rate of supply of air for the combustion of the fuel, a source of current, and a plurality of electrical conductors fed thereby, all of the aforesaid means being adapted to vary the magnitude of the current flow through said conductors as an indication of the magnitude of the quantities to which the said means are responsive.

25. In combination with a boiler, means responsive to the rate of flow of steam therefrom, means responsive to the steam pressure therein, means responsive to the rate of supply of fuel thereto, means responsive to the rate of supply of combustion air thereto, a source of current, a plurality of electrical conductors fed thereby, said means being adapted to vary the magnitude of the current flow through said conductors, a remote control means responsive to variations of the current flow in said conductors, means to vary the rate of supply of fuel, and means to vary the rate of supply of combustion air, said supply varying means being responsive to said remote control means.

26. In combination with a boiler, means responsive to the rate of flow of steam therefrom, means responsive to the steam pressure therein, means responsive to the rate of supply of fuel thereto, means responsive to the rate of supply of combustion air thereto, means to obtain the steam-fuel ratio, means to obtain the fuel-air ratio, means to make a change in steam pressure measured by said steam pressure responsive means equivalent to a change in steam flow rate, means to vary the rate of supply of fuel, and means to vary the rate of supply of air, said supply varying means being responsive to changes in said ratio obtaining means so as to maintain predetermined steam-fuel and fuel-air ratios.

27. In combination with a boiler, means responsive to the rate of flow of steam therefrom, means responsive to the steam pressure therein, means responsive to the rate of supply of fuel thereto, means responsive to the rate of supply of combustion air thereto, a source of current, a plurality of electrical conductors fed thereby, said means being adapted to vary the magnitude of the currents flowing through said conductors, means responsive to some of said current variations to obtain the steam-fuel ratio, means responsive to changes of said ratio from a predetermined ratio to vary the rate of supply of fuel; means responsive to other of said current variations to obtain the fuel-air ratio, and means responsive to changes of said ratio from a predetermined ratio to very the rate of supply of air.

28. An automatic control for a boiler to determine the pressure therein and means for regulating said control to vary the pressure determined thereby automatically in a predetermined manner in accordance with the rate of use of steam.

29. In combination, an automatic control for a boiler to determine the pressure therein, means responsive to the rate of flow of steam therefrom, and means responsive to said flow responsive means for regulating said control to fix the pressure in said boiler at a value that is a variable dependent in a predetermined manner on the rate of flow of steam from the boiler.

30. The combination with a boiler and units supplied with steam therefrom, of a boiler pressure control to supply said units with constant pressure steam at the unit, said control including means for maintaining the boiler pressure, and means for automatically so varying the maintained pressure in response to the rate of flow of steam that the pressure at the units is constant.

31. The method of automatically controlling a steam generating plant which consists in metering the steam rate and the fuel supply rate, substituting for these rates their logarithmic values, subtracting the logarithmic values, substituting for their difference the antilogarithmic value, or steam-fuel ratio, comparing this existing steam-fuel ratio to a desirable steam-fuel ratio, varying said desirable steam-fuel ratio upon variations in the steam rate, and varying the fuel supply rate upon deviations of the existing steam-fuel ratio from the desirable steam-fuel ratio.

32. The method of automatically controlling combustion of a steam plant which consists in metering the fuel supply and the air supply rates, substituting for these rates their logarithms, subtracting the logarithms, substituting for their difference the antilogarithm, of fuel-air ratio, comparing this existing fuel-air ratio to a desirable fuel-air ratio, and varying the air rate upon deviations of said existing fuel-air ratio from the desirable fuel-air ratio.

33. In an automatic combustion control for a steam generator, electrical circuits including steam, fuel, air, and a plurality of ratio impedances, means to maintain the steam impedance at a value dependent upon the logarithm of a number proportional to the rate of steam flow from said generator, means to maintain the fuel impedance at a value dependent upon the logarithm of a number proportional to the rate of fuel fed to said generator, means to maintain the air impedance at a value dependent upon the logarithm of a number proportional to the rate of air supplied to said generator, and means to maintain the ratio impedances at values dependent upon the differences between the steam, fuel, and air impedances, considering two at a time.

34. In an automatic combustion control for a steam generator, electrical circuits including steam, fuel, air, and ratio impedances, means to maintain the steam impedance at a value dependent upon the logarithm of a number proportional to the rate of steam flow from said generator, means to maintain the fuel impedance at a value dependent upon the logarithm of a number proportional to the rate of fuel feed to said generator, means to maintain the air impedance at a value dependent upon the logarithm of a number proportional to the rate of air supplied to said generator, means to maintain a ratio impedance at a value dependent upon the difference between the steam and fuel impedances, and means to maintain another ratio impedance at a value dependent upon the difference between the fuel and air impedances.

35. In an automatic combustion control for a steam generator, electrical circuits including steam, fuel, and ratio impedances, means to maintain the steam impedance at a value dependent upon the logarithm of a number proportional to the rate of steam flow from said generator, means to maintain the fuel impedance at a value dependent upon the logarithm of a number proportional to the rate of fuel feed to said generator, and means to maintain a ratio impedance at a value dependent upon the difference between the steam and fuel impedances.

36. In an automatic combustion control, electrical circuits including fuel, air, and ratio impedances, means to maintain the fuel impedance at a value dependent upon the logarithm of a number proportional to the rate of fuel feed, means to maintain the air impedance at a value dependent upon the logarithm of a number proportional to the rate of air supplied, and means to maintain a ratio impedance at a value dependent upon the difference between the fuel and air impedances.

37. In combination, a furnace, means to feed fuel to said furnace, means to feed air to said furnace, a scale graduated to numerical values of the combustion ratio, a cooperating element arranged to be set at the numerical value of a desired combustion ratio, and means responsive to the setting of said element to vary the relative rate of feed of fuel and air to keep the actual ratio at the value desired.

38. In combination, a furnace, means to feed fuel to said furnace, means to feed air to said furnace, a scale graduated to numerical values of the combustion ratio, a cooperating movable element arranged to be set at the numerical value of desired combustion ratio, means to determine the existing ratio, means to compare the existing with the desired ratio, and means to vary the relative rate of feed of fuel and air to tend to correct deviations from the desired ratio.

39. The method of automatically controlling a steam generating plant which consists in metering the steam rate and the fuel supply rate, substituting for these rates their logarithmic values, subtracting the logarithmic values, substituting for their difference the anti-logarithmic value or steam-fuel ratio, comparing this existing steam-fuel ratio to a desirable steam-fuel ratio, and varying the fuel supply rate upon deviations of the existing steam-fuel ratio from the desirable steam-fuel ratio.

40. The method of automatically controlling a steam generating plant which consists in metering the steam rate, the fuel supply rate, and the air supply rate, substituting for these rates their logarithmic values, subtracting the steam and fuel logarithms, subtracting the fuel and air logarithms, substituting for the differences the anti-logarithmic values or steam-fuel and fuel-air ratios, comparing the existing ratios with the desirable ratios, and varying the fuel supply and air supply rates upon deviations of the existing ratios from the desirable ratios.

BERNARD S. FRANKLIN.